No. 633,646. Patented Sept. 26, 1899.
J. C. HAGERTY.
BARK CUTTING AND REDUCING MACHINE.
(Application filed June 23, 1898.)
(No Model.)
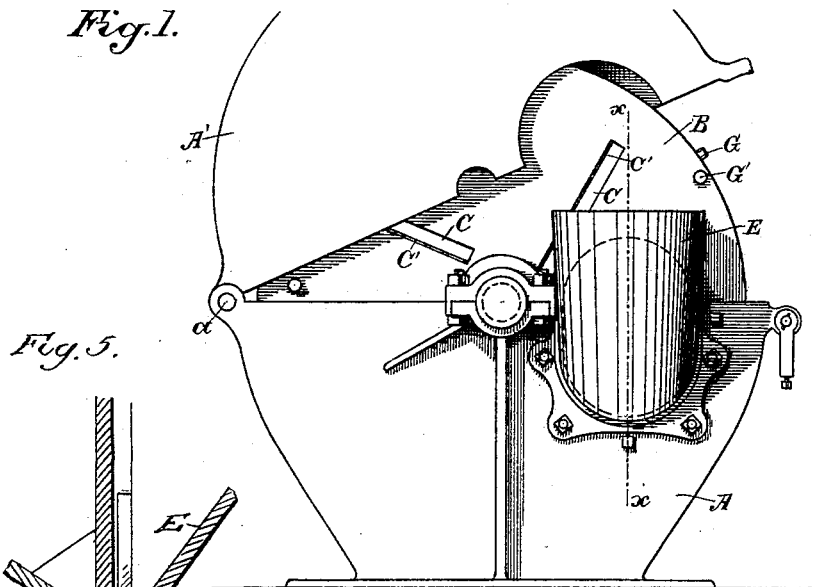
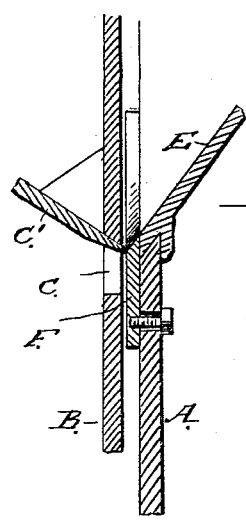
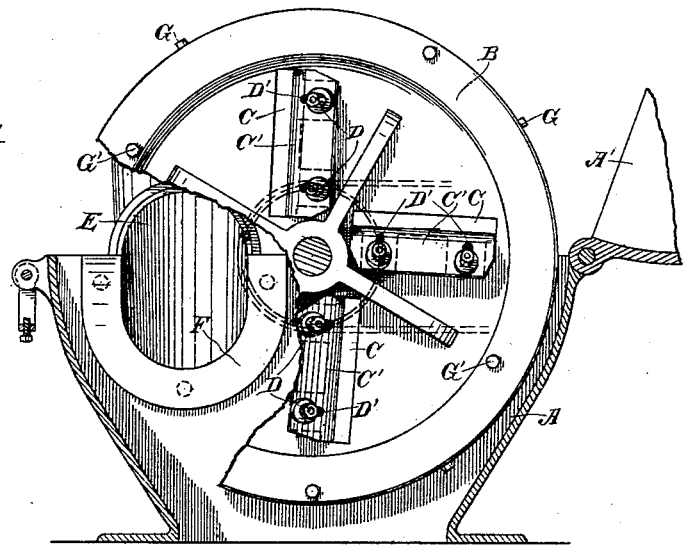
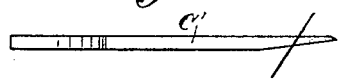
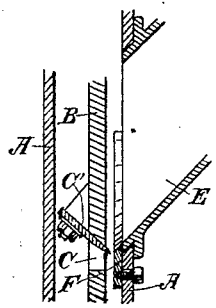
Witnesses,
Inventor,
John C. Hagerty
By Dewey Strong & Co.
att'ys

UNITED STATES PATENT OFFICE.

JOHN C. HAGERTY, OF SANTA CRUZ, CALIFORNIA.

BARK CUTTING AND REDUCING MACHINE.

SPECIFICATION forming part of Letters Patent No. 633,646, dated September 26, 1899.

Application filed June 23, 1898. Serial No. 684,215. (No model.)

*To all whom it may concern:*

Be it known that I, JOHN C. HAGERTY, a citizen of the United States, residing at Santa Cruz, county of Santa Cruz, State of California, have invented an Improvement in Bark Cutting and Reducing Machines; and I hereby declare the following to be a full, clear, and exact description of the same.

My invention relates to a machine that is especially designed for cutting, shaving, or reducing bark to a fine condition in preparation for its further use for the purpose of tanning or for such other uses as it may be devoted to.

It consists in details of construction which will be more particularly described by reference to the accompanying drawings, in which—

Figure 1 is a front view of my machine. Fig. 2 is a rear view. Fig. 3 is a detail section on line $x\,x$, Fig. 1. Fig. 4 is an edge of the cutter. Fig. 5 is an enlarged sectional detail of the plate F and portions of the spout and cutter.

The case is made in two parts A A', of solid cast-iron, hinged together at one edge, as shown at $a$, so that the upper part of the case may be opened to expose the disk B, which is horizontally journaled within the case. The disk has oblique slots made through it, as shown at C, and the knives or cutters C' are fitted into these slots. The slots are made oblique to radial lines from the center of the disk, so that when the knives are fixed therein they will make a shearing cut as they pass through the bark, which is pressed against them as they revolve, and this insures a better and easier operation of the knives and prevents their pulling out the bark in strings, as is liable to be the case if the cutters strike it at right angles. The knives are adjusted, as occasion requires, by means of set-screws D. Slots or oval openings D' are made in the backs of the knives to allow for their adjustment when the screws have been loosened, after which they are again set up. The edges of the knives are preferably made with a long bevel upon one side and a short one upon the opposite side, so that they are ground or sharpened from both edges and will retain their cutting edge in better condition than if the bevel is all made from one side.

The feed-opening is a rounded opening into one side of the lower part A of the case and has a correspondingly-shaped feed-spout E extending upwardly and outwardly from the opening, so that the bark, which is usually curled and rolled up, is easily introduced into this opening, approaching the knives obliquely, and as the knives themselves pass the feed-opening at an oblique angle they produce the shearing cut, which is most effective in reducing and shaving the bark. Upon the inner edge of the feed-opening is a hardened plate F, with an upper surface inclined and standing in line with the inner wall of the spout E, the upper edge of this inclined portion being sharpened and the said inclined portion permitting the bark to pass freely to the cutter. The plate F also serves as an abutment with which the cutter operates to properly shave the bark and prevents the latter being pulled through in strings or strips without being properly reduced.

The disk runs very closely within the case, and in order to prevent any clogging by reason of small particles of bark being thrown up and lodging in the case I have shown pins or lugs G projecting from the periphery of the disk and alternating upon one edge and the other, so that they will sweep out any particles which may lodge in line with the periphery of the disk. Upon the sides of the disks are also fixed similar lugs or pins G', and these are arranged in a similar manner, alternating out of line with each other, and all the pins together serve to keep the case clear and to allow the disk and cutters to revolve with the utmost freedom. The rolls of bark being introduced endwise through the inclined feed-chute, come in contact with the rapidly-revolving cutters carried by the disk and will be cut into thin shavings across the grain by the shearing action of the obliquely-set cutters. The material thus sheared off passes back through the openings in the disk, in which the cutters are set like a plane, and it is pulverized by the rapid rotation and falls through an opening in the lower part of the case.

Having thus described my invention, what I claim as new, and desire to secure by Letters Patent, is—

1. In a bark shearing and reducing apparatus, an inclosing casing and a disk revoluble therein, obliquely-disposed cutters adjustably fixed to the disk, said cutters having double beveled edges, the shorter one of which is slightly inclined to or approximately parallel with the face of the disk, a feed-chute oblique to the plane of travel of the cutters, and a shear-plate adjustably fixed within the case having its concavity coincident with that of the chute and beveled to the same inclination.

2. In a bark shearing and reducing apparatus, an inclosing casing and a disk revoluble therein, obliquely-disposed cutters fixed to said disk, an obliquely-disposed feed-chute opening through the side of the casing, a correspondingly-concaved shear-plate having its edge beveled to coincide with the inclination of the chute, and pins or lugs fixed to the disk and to the interior of the case whereby lodgment of the bark is prevented.

In witness whereof I have hereunto set my hand.

JOHN C. HAGERTY.

Witnesses:
S. H. NOURSE,
GEO. H. STRONG.